United States Patent

Brooks

[15] 3,644,012
[45] Feb. 22, 1972

[54] RECORDING MICROHOLOGRAMS OF MAGNIFIED VIRTUAL IMAGES

[72] Inventor: Robert E. Brooks, Redondo Beach, Calif.
[73] Assignee: TRW Inc., Redondo Beach, Calif.
[22] Filed: Oct. 16, 1970
[21] Appl. No.: 81,456

[52] U.S. Cl. ............................................350/3.5, 350/122
[51] Int. Cl. .......................................................G02b 27/00
[58] Field of Search ..........................................350/3.5

[56] References Cited

UNITED STATES PATENTS 3,514,176  5/1970  Brooks et al. ............................350/3.5

OTHER PUBLICATIONS

Kock, et al., Proc of the IEEE, Vol. 54, Dec. 1966, p. 1985.

*Primary Examiner*—David Schonberg
*Assistant Examiner*—Ronald J. Stern
*Attorney*—Daniel T. Anderson, Edwin A. Oser and Jerry A. Dinardo

[57] ABSTRACT

A microhologram of a magnified virtual image of the object is recorded. This is accomplished by a lens interposed between the object and the hologram. The object is positioned in a plane spaced from the front focal plane of the lens by a distance which determines the desired magnification. The hologram itself is disposed approximately in the rear focal plane of the lens. The hologram is reproduced by the conjugate reference beam of the one that was used for recording it. This will generate a magnified real image which may be projected on a screen. By means of a lens, the image may be directed in a desired direction. However, no lens is required for viewing the magnified reproduced object.

4 Claims, 3 Drawing Figures

Robert E. Brooks
*INVENTOR*

BY [signature]

ATTORNEY

RECORDING MICROHOLOGRAMS OF MAGNIFIED VIRTUAL IMAGES

BACKGROUND OF THE INVENTION

This invention relates generally to holography, and particularly relates to an apparatus for recording microholograms and reproducing them with great magnification without the necessity of utilizing lenses for viewing the reproduced image.

In the past, holographic recording systems have been proposed which permit the magnification of the image recorded on the hologram. Most of these systems, however, require the use of lenses for magnifying the reproduced image. Such a system has been proposed in the U.S. Pat. No. 3,427,090 to Justh, et al. According to this system, the real image is focused at a plane between the focusing line and the hologram.

Also, U.S. Pat. No. 3,506,327 to Leith, et al., includes an embodiment illustrated in FIGS. 10 and 11 for reproducing the hologram with magnification. A divergent reference beam is used and the location of its apparent source between the recording the reproducing step is changed.

Still another scheme has been proposed in the British Pat. 1,139,955 to RCA, where FIG. 4 shows apparatus for recording microholograms. In this case, the lens is disposed in the scene beam ahead of the object or transparency.

It is accordingly an object of the present invention to provide apparatus for recording and reproducing microholograms so that a magnified image of the object may be viewed without the necessity of a lens for viewing the image.

Another object of the present invention is to record a virtual image in such a manner that any desired magnification may be obtained during the recording step.

A further object of the present invention is to record a hologram of an object by means of a lens so that actually the hologram sees the object at a different location and size through the combination of lens and object.

SUMMARY OF THE INVENTION

Apparatus in accordance with the present invention serves the purpose of recording microholograms. The apparatus comprises a source of monochromatic coherent light such as a laser. This monochromatic light is split into a recording reference beam and a scene beam. A light-responsive recording medium is disposed in a predetermined plane for recording the hologram. The recording reference beam is directed toward this plane. The scene beam is also directed toward the recording plane. Finally, a lens is disposed in the path of the collimated scene beam. This lens has a rear focal plane which generally approximately coincides with the predetermined plane where the recording medium is located. The lens also has a front focal plane so that an object may be disposed between the lens and its front focal plane for recording on the medium a hologram of the magnified virtual image of the object. The distance between the object and the front focal plane of the lens determines the magnification which is obtainable.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawing in which:

DESCRIPTION OF THE PREFERRED EMBODIMENT

Figure 1:
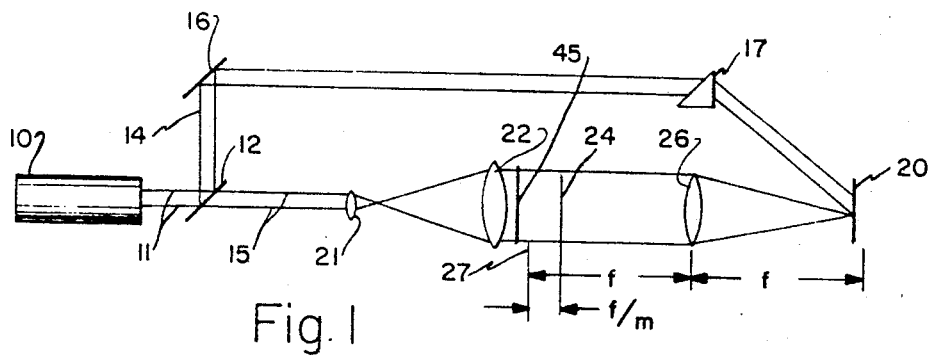
FIG. 1 is a schematic view of an apparatus for recording microholograms in accordance with the present invention.

Referring now to the drawing, and particularly to FIG. 1, there is illustrated apparatus for recording microholograms in accordance with the present invention. The apparatus includes a source 10 of monochromatic, coherent light. This may, for example, consist of any conventional laser for developing an output light beam 11 which is usually collimated. The light beam 11 may be split by a beam splitter 12 into a recording reference beam 14 and a scene beam 15. The reference beam 14 may be directed by a reflector 16 and, for example, by a prism 17 onto a plane 20. In this plane 20, there may be disposed a light-responsive recording medium such as, for example, a photographic plate or film or a photochromic medium for recording a hologram.

By means of a suitable lens 21, the scene beam 15 may be enlarged. By way of example, the lens 21 may be a positive lens as shown and, by permitting the light beam to proceed past the focal point, it is enlarged as shown. The scene beam may then be collimated by a second lens 22 whereby the two lenses 21 and 22 may form a telescope. However, it will be understood that the scene beam need only be enlarged and thereafter collimated in case the size of the object shown at 24 is larger than the diameter of the original light beam such as 15.

In accordance with the present invention, a lens 26 is interposed between the object 24 and the recording medium 20. As shown, the lens 26 has a focal length $f$. The hologram 20 is generally disposed approximately but not exactly in the rear focal plane of the lens 26. In other words, the hologram 20 is spaced say somewhat less than the focal distance from the lens 26. Also, the object 24 is spaced a certain distance from the front focal plane 27. This distance is $f/M$, where $M$ is the desired magnification.

Figure 2:
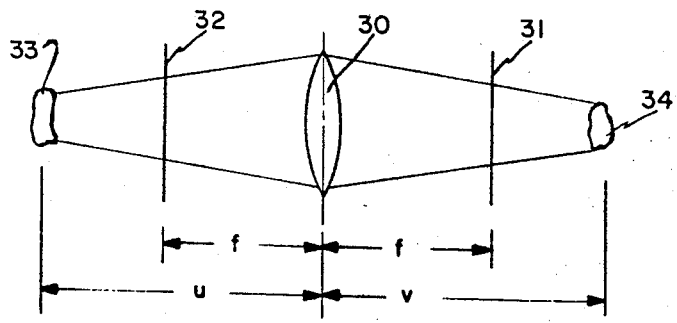
FIG. 2 is a view of a lens with an object with its image for explaining some geometric relations and the magnification obtainable with the arrangement of FIG. 1.

This magnification will now be explained by means of FIG. 2. Here, a lens 30 is shown having a rear focal plane 31 and a front focal plane 32, each being spaced from the lens by the distance $f$, where $f$ is the focal length. An object 33 is disposed ahead of the front focal plane 32, and a corresponding image 34 is projected in a plane beyond the rear focal plane 31. Thus, $u$ is the distance between object 33 and lens 30, while $v$ is the distance between lens 30 and image 34.

Assuming now that the thickness of lens 30 may be disregarded, the so-called thin lens equation prevails as shown below:

$$\frac{1}{u}+\frac{1}{v}=\frac{1}{f} \quad (1)$$

From this equation, it will be apparent that, if $u$ approaches $f$, $v$ approaches infinity. This means that if the object is located at the front focal plane 32, the image is at infinity. On the other hand, if $u$ is smaller than $f$—that is, if the object is disposed between the front focal plane 32 and the lens 30—$v$ changes sign. This means that the image 34 becomes a virtual image and appears to the left of the lens 30 or on the same side as the object 33.

Thus, assuming the conditions of FIG. 1 where the object 24 is between the front focal plane 27 and the lens 26, $u$ may be expressed as follows:

$$u = f - \frac{f}{M} \quad (2)$$

Here, the distance $f/M$ has been marked in FIG. 1. With this assumption, we now obtain the magnification $M$ as follows:

$$(v/w) = -M \quad (3)$$

Thus, simply the ratio of $v$, the distance of the image from the lens divided by the distance of the object from the lens, determines the magnification.

It will now be evident that by controlling the distance $f/M$, the magnification may be determined.

Preferably, the object 24 is a transparency. This may, for example, consist of a transparent 16-millimeter film frame. Thus, it may be possible to record a plurality of microholograms on the recording medium 20 by projecting, in succession, a plurality of transparencies from a motion picture film. In that case, it will be understood that, in general, the recording medium 20 must be moved for each recording or hologram.

It will now be evident that the combination of the lens 26 with the object 24 jointly generates a virtual image of the object 24, and that this virtual image is magnified. Accordingly, what is recorded is not the real object 24, but the magnified virtual image of the object created by the lens 26. As a result, the hologram sees the object at a different location and at a different size from that of the real object.

It should be noted that, instead of using a collimated reference beam as shown in FIG. 1, it is also feasible to use a divergent or even a convergent reference beam; that is, a reference wave having a spherical wave front.

It should also be noted that the recording medium 20 in general need not be disposed exactly at the front focal plane of the lens 26. However, when the medium 20 is between the lens 26 and the front focal plane of the lens, there is an efficient transfer of the light containing the low spatial frequencies of the object. Those are the frequencies within the frequency cutoff created by the aperture of the hologram. Also, in this case, the location of the reconstructed image upon playback is substantially insensitive to lateral position variations of the hologram.

If the recording medium 20 is at the exact rear focal plane of a lens, the light may be concentrated too much. Thus, a sharp focus of the undiffracted image of the object should be avoided. This may be done by moving the recording medium 20 to a position between the lens 26 and its rear focal plane.

Figure 3:
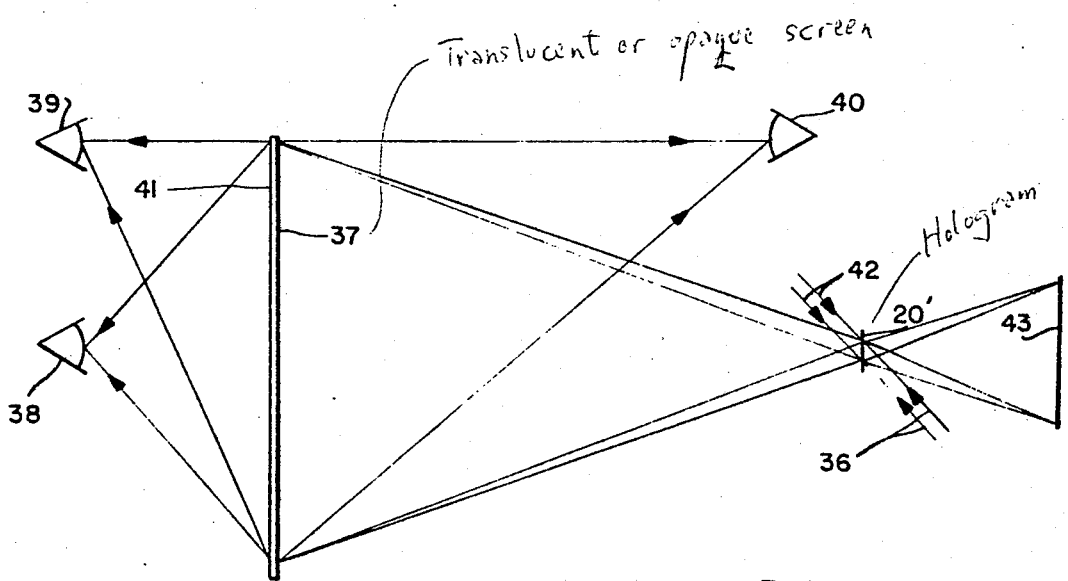
FIG. 3 is a schematic representation of the apparatus used for reproducing the magnified image from the hologram recorded by the apparatus of FIG. 1.

The recorded and developed or processed hologram 20 may be reproduced by the apparatus of FIG. 3. Here, the hologram 20 is illuminated by a reproducing reference beam 36 which is the conjugate of the recording reference beam 14 of FIG. 1. As a result, a real image of the recorded, magnified virtual image is obtained. Thus, what is reproduced is the enlarged real image of the object without the use of a lens. This enlarged image may be projected upon a projection screen 37 and may be viewed in different directions as shown by the positions of an eye 38, 39 and 40. A lens 41, which may be a Fresnel lens, may be associated with the projection screen 37 for the purpose of concentrating or directing the light in a predetermined viewing area. However, it will be understood that such a lens is not needed. The screen 37 may be translucent or white, depending upon whether the object is to be viewed through the screen or reflected from the screen as shown at 40.

For example, assuming that the original object 24 is a 16-millimeter film transparency with a usable width of 10.5 millimeters, the real image played back or reproduced upon the screen 37 may be as large as say 250 millimeters. The resulting magnification is 23.8 times.

Instead of reproducing the hologram in the manner explained above, it is also possible to play back the hologram with the same reference beam that was used for recording the hologram. Thus, in FIG. 3, the playback reference beam is shown at 42 and may form a magnified projected image as shown at 43. In this case, it is also feasible to displace the object as shown at 45 in FIG. 1. In other words, the object may be disposed behind the lens 22 by a distance from the lens 26 that is greater than the focal length $f$. In that case, the magnified real image 43 is projected as shown in FIG. 3.

There has thus been disclosed apparatus for recording microholograms which may be reproduced without the use of lenses with a large magnification. The microhologram actually records a magnified virtual image of the real object by the use of a lens interposed between the object and the hologram. The object is displaced from the rear focal plane of the lens by a distance which determines the magnification. This permits viewing of the microhologram on a vastly enlarged scale without requiring anything but the conjugate of the reference beam, by means of which the hologram was originally taken, and a screen. If the recording is carefully done, the image is free of aberration.

What is claimed is:
1. Apparatus for recording microholograms comprising:
   a. a source of monochromatic, coherent light;
   b. means for splitting said monochromatic light into a recording reference beam and a scene beam;
   c. a light-responsive recording medium disposed in a predetermined plane;
   d. means for directing said recording reference beam toward said plane;
   e. means for directing said scene beam toward said plane; and
   f. a lens disposed in the path of said scene beam, said lens having a rear focal plane and a front focal plane whereby an object may be disposed between said lens and said front focal plane for recording on said medium a hologram of a magnified virtual image of the object, and said medium being disposed approximately at said rear focal plane for efficient transfer of light containing the low spatial frequencies of the object.

2. Apparatus as defined in claim 1 wherein the object is a transparency.

3. Apparatus as defined in claim 2 wherein the transparency is a 16-millimeter film.

4. Apparatus as defined in claim 1 wherein the distance between the plane of the object and said front focal plane is $f/M$, where $f$ is the focal length of said lens and $M$ is the desired magnification.

* * * * *